United States Patent

Lawlor

[15] 3,651,559
[45] Mar. 28, 1972

[54] MANUFACTURING A SEAMLESS PRESSURE VESSEL

[72] Inventor: Andrew W. Lawlor, Erie, Pa.

[73] Assignee: Kaiser Aluminum & Chemical Corporation, Oakland, Calif.

[22] Filed: Apr. 13, 1970

[21] Appl. No.: 27,785

[52] U.S. Cl..........................29/422, 29/148.4 B, 29/DIG. 47
[51] Int. Cl. ........................................B23p 17/00, B21h 1/14
[58] Field of Search..................29/422, 400, 400 D, 148.4 B, 29/DIG. 11, DIG. 47; 72/349, 364; 220/3

[56] References Cited

UNITED STATES PATENTS

| 857,616 | 6/1907 | Gault | 72/349 X |
| 861,403 | 7/1907 | Spahr | 72/364 |
| 955,698 | 4/1910 | Schatz | 29/148.4 B |
| 1,591,372 | 7/1926 | Gafvert et al | 29/148.4 B |

FOREIGN PATENTS OR APPLICATIONS

| 453,655 | 9/1936 | Great Britain | 29/148.4 B |

*Primary Examiner*—Thomas H. Eager
*Attorney*—James E. Toomey, Paul E. Calrow, Harold L. Jenkins and John S. Rhoades

[57] ABSTRACT

Improved method of manufacturing metallic seamless spherical pressure vessel wherein the vessel is controllably worked and heat treated during fabrication in such fashion that the final vessel has no localized weakened areas and full advantage is taken of the spherical shape of the vessel.

8 Claims, 7 Drawing Figures

Patented March 28, 1972  3,651,559

INVENTOR.
ANDREW W. LAWLOR
BY John S. Rhoades
ATTORNEY.

MANUFACTURING A SEAMLESS PRESSURE VESSEL

BACKGROUND OF THE INVENTION

This invention relates to an improved process for producing a metallic seamless, weld-free, spherical pressure vessel or container. More particularly, it relates to a process for producing a seamless, unitary weld-free, spherical high pressure container made of light metal, such as aluminum, which is produced by a combination impact extrusion and cupping operation at room temperature as well as appropriate heat treating. The cold working to which the workpiece is subjected during the process is substantially fully controlled at all times so that the metal throughout the wall structure in directions parallel as well as crosswise to the grain of the metal is of high strength. The mechanical properties, such as the tensile and yield strengths of the metal in the finally fabricated container, are materially increased as a result of the combination cold work and heat treating of the article during the manufacturing steps so that each part of the final vessel will bear its fair share of internal loading pressures.

Containers, including pressure containers, have been conventionally mass produced in the past by impact extrusion processes alone or by cupping or drawing processes alone. In the instant invention, there has been an unique and advantageous integration of the two metal forming operations whereby seamless, weld-free, spherical pressure containers of uniform quality can be manufactured on a mass production basis from a light metal, such as aluminum. The pressure vessel or container can have a relatively thin wall structure that is uniformly elongated to provide the wall with the high strength required to sustain substantial internal pressures on the order, for example, of about 9,000 psi without fracture due to strength imparted to the walls by selected cold working and heat treating operations.

The instant spherical vessel or container as produced by the instant process can be used as a pressure vessel for high pressure gases and the like, including materials normally used in fire extinguishers, etc. The particular fabricating process used permits precise control of the metal during each of the individual fabrication steps so that the thicknesses of each part of the wall and the open end or mouth of the container are maintained in the desired range. This same control allows for mass production of uniform and high quality spherical pressure vessels.

SUMMARY OF THE INVENTION

It is a primary purpose of the instant invention to provide an improved process for mass forming seamless, weld-free, spherical pressure vessel or container, and, preferably, one made out of aluminum. The spherical wall of the final pressure vessel has excellent mechanical properties, particularly in terms of yield and tensile strengths. For the purposes of this invention, tensile strength is defined as the force or load measured in pounds per square inch which is required to fracture the metal. Yield strength is defined as the load measured in pounds per square inch which is required to put a permanent stretch in the metal. Uniformly high yield and tensile wall strengths are particularly important and significant in the case of a mass produced spherical pressure vessel so that each such vessel will have a predetermined high bursting strength.

The various process steps advantageously include impact extrusion, progressive cupping and heat treating steps. During the forming operations, flow of the metal, as it is incrementally shaped into the final configuration of the container, is maintained under precise control substantially at all times so that undesirable localized thinning and weakening of the vessel wall are prevented. In one of the working steps of the process such as the cupping step the metal wall can be advantageously elongated crosswise and parallel to the grain to give the vessel wall multidirectional strength.

With reference to the drawings, the unitary spherical pressure vessel 10 is fabricated preferably of a solution heat treatable aluminum alloy, such as 6070. The chemical composition of this alloy has been designated by The Aluminum Association as follows:

| | |
|---|---|
| Silicon | 1.0–1.7% |
| Iron | 0.50% |
| Copper | 0.15–0.40% |
| Manganese | 0.40–1.0% |
| Magnesium | 0.50–1.2% |
| Chromium | 0.10% |
| Zinc | 0.25% |
| Titanium | 0.15% |
| Other, each | 0.05% |
| Others, total | 0.15% |
| Aluminum, remainder | |

Figure 1:
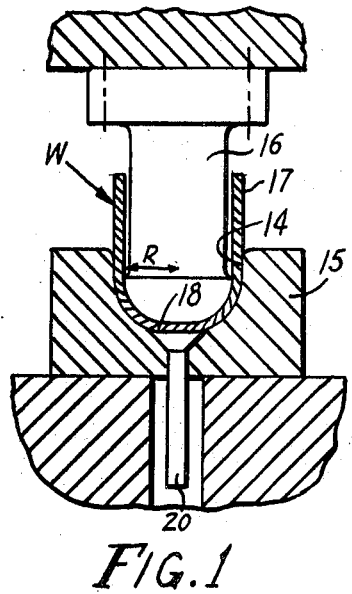
FIGS. 1 and 2 illustrate the progressive impact extrusion steps involved in finally forming a cylindrical shell provided with a hemispherical bottom.
Figure 2:
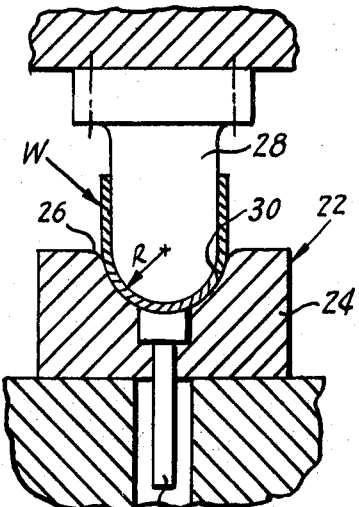

In one advantageous embodiment of the invention, a circular slug or workpiece W of the above metal is placed in the cavity 14 of the female die 15 of FIG. 1. This slug can have been taken from a rod and then forged and annealed prior to being placed in cavity 14. It is then extruded or forced backward in the usual fashion by the male ram 16 and elongated into a cylindrical shell provided with an upper shell portion 17 and a partially hemispherical bottom 18.

Figure 7:
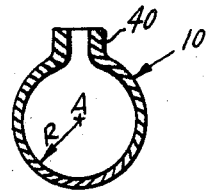
FIG. 7 is a cross-sectional view of a finally formed unitary spherical, seamless pressure container.
Figures 3, 4, 5, 6:
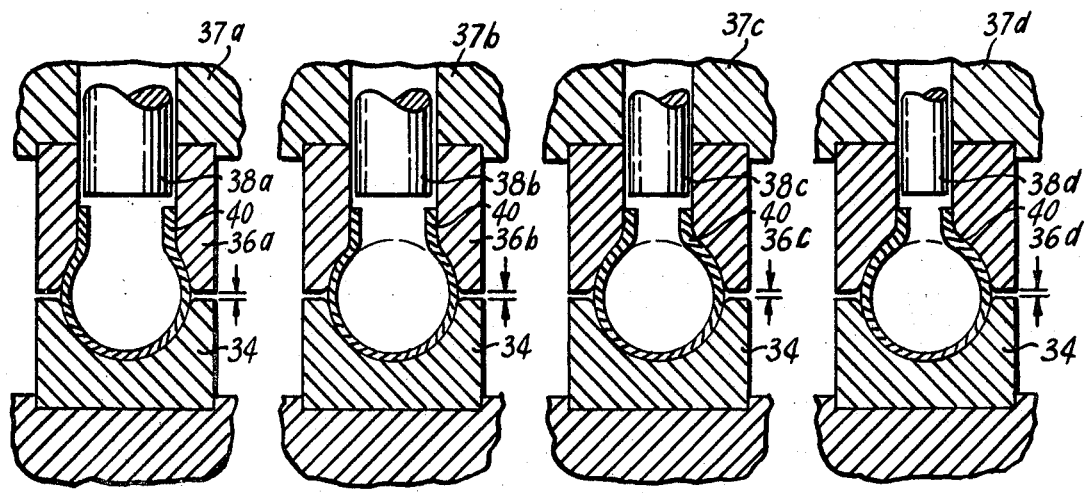
FIGS. 3 through 6 disclose several successive and incremental cupping operations involved in finally shaping the cylindrical shell portion or upper half of the shell into the finally desired vessel shape.

At this time, it will be noted that the bottom portion of the workpiece W has now assumed a convex configuration. The longest radius generated from a central point A inside the workpiece approximates or generally coincides with the length of the final overall radius R of the spherical vessel wall of FIG. 7. In other words, during the initial impact extrusion operation of FIG. 1 the partial formation of the lower hemispherical part of the sphere takes place.

In order to complete the spherical formation of the bottom half of the article, workpiece W is ejected from the female die 15 by ejector 20 and then transferred in a conventional manner to a second die apparatus 22 which may be considered to be a sizing die for finally sizing the aforesaid lower hemispherical portion of the shell.

Die apparatus 22 includes the usual female die 24 provided with a die orifice 26 for receiving the male die member 28 together with an ejector pin 29. Die member 28 forces the hemispherical portion of the workpiece into full contact with the hemispherical seat 30 which has the precise outer spherical configuration of one-half of the final product 10.

From die apparatus 22 the workpiece W is transferred to a series of reducing or cupping dies, FIGS. 3–6 of the drawings, which progressively and incrementally cup or compress the upper cylindrical portion of the workpiece into the final spherical shape of the vessel.

As indicated in FIGS. 3–6, the bottom die and support 34 for the workpiece can be located in a standard indexing table device that is indexed from cupping station to cupping station while having a selected dwell time at each station.

It will be noted that the inside of the workpiece W, as it is progressively formed in the cupping dies, is unsupported. However, this is not significant since only a small incremental compression of the cylindrical portion of the shell or workpiece W takes place at each cupping station and no material disturbance of the lower hemispherical portion or bottom of the workpiece takes place at any cupping station.

As indicated in FIGS. 3–6, each of the progressively reduced in size cupping dies co-operates with the lower female die 34. Each of the cupping dies 36a–d includes a movable apertured platen 37 to which the recessed portion of the cupping die is attached and an ejector pin designated 38a–d.

The workpiece holder or lower die 34 is registered with each cupping die 36a–d and the cupping dies and holder 34 are brought progressively together in the direction of the arrows and closed about the workpiece disposed therebetween. As the die elements come together, they force the upper cylindrical portion of the workpiece shell to incrementally assume a spherical configuration at the same time that the upper open part of the workpiece incrementally takes the shape of an open neck 40. Each cupping operation takes place without disturbing the bottom and fully formed part of the vessel and without any undesirable thinning of the spherical wall.

During the various cupping operations, selected amounts of the metal in the cylindrical wall portion of the workpiece are caused to flow up into the neck 40 so that the neck 40 is advantageously deliberately overthickened whereby it contains an excess of metal for a subsequent threading operation, if the same is desired.

In a preferred embodiment of the invention the workpiece W can be selectively annealed after the impact extruding operation and prior to the various cupping operations. The finally shaped vessel 10 is also solution heat treated and then preferably artificially aged whereby the final product will have the properties including temper of a T–6 aluminum alloy as such alloy is designated by the Aluminum Association.

Desirably when made of a 6070 aluminum alloy the final spherical pressure vessel in order to possess a minimum rupture strength of 8,950 psi, while having a wall thickness of 0.320 inch, should have a minimum yield strength of 45,000 psi and a tensile strength of 50,000 psi. The incremental elongation of the spherical wall parallel and crosswise to the grain of the metal is of advantage in obtaining such yield and tensile strengths.

If desired, the various cupping die members can be fashioned in such a way that the sphere can be provided with rib elements which would serve as excellent reinforcing members in the final product. Further, in lieu of aforedescribed solution heat treatment of the finished vessel, a solution heat treatment can take place prior to the sizing operation and after the first extrusion operation of FIG. 1. In this instance the usual annealing step prior to the cupping operation is eliminated. In such instance also the aluminum metal exhibits the properties of T–4 metal, as designated by the Aluminum Association, prior to the sizing operation and the properties of T–81 metal, as designated by the Aluminum Association, after the cupping operation provided the finished vessel is artificially aged after the cupping operation.

An advantageous embodiment of the invention has been shown and described. It is obvious that various changes and modifications may be made therein without departing from the scope of the appended claims wherein what is claimed is:

1. The method of forming a wrought metal sphere comprising the steps of impact extruding a metal blank to form a cylindrical shell having an integral hemispherical bottom of uninterrupted smooth walled configuration, thereafter without locking major portions of the shell to die elements progressively and incrementally compressing the cylindrical portion of the shell in order to complete the forming of the shell into a sphere, and all during said extruding and compressing of the shell exercising substantially full control over the metal by cold flowing the metal at any given time substantially uniformly in all directions so as to avoid excessive build-up of the metal in given parts of the shell structure and undesirable thinning of the metal in the shell structure.

2. The method of forming a wrought metal sphere comprising the steps of impact extruding a metal blank to form a cylindrical shell having an integral hemispherical bottom, thereafter progressively and incrementally compressing the cylindrical portion of the shell to complete the forming of the sphere, during said extruding and compressing of the shell exercising substantially full control over the cold flow of the metal so as to avoid excessive build-up of the metal in given parts of the shell structure and undesirable thinning of the metal in the shell structure, and annealing the shell after the extruding of the shell and prior to the compressing of the cylindrical portion of the shell.

3. The method of forming a wrought metal sphere comprising the steps of impact extruding a metal blank to form a cylindrical shell having an integral hemispherical bottom, thereafter progressively and incrementally compressing the cylindrical portion of the shell to complete the forming of the sphere and during said extruding and compressing of the shell exercising substantially full control over the cold flow of the metal so as to avoid excessive buildup of the metal in given parts of the shell structure and undesirable thinning of the metal in the shell structure and heat treating the shell after the full spherical formation thereof.

4. The method of claim 3 wherein the metal being formed into a sphere is aluminum and the heat treating step comprises a solution heat treating of the finished shell.

5. The method of claim 4 including the step of artificially aging the finished shell.

6. The method of forming a wrought metal sphere comprising the steps of impact extruding a metal blank to form a cylindrical shell having an integral hemispherical bottom, thereafter progressively and incrementally compressing the cylindrical portion of the shell to complete the forming of the sphere and during said extruding and compressing of the shell exercising substantially full control over the cold flow of the metal so as to avoid excessive buildup of the metal in given parts of the shell structure and undesirable thinning of the metal in the shell structure and said impact extruding being performed in multiple steps the last of which involves finally forming the hemispherical bottom of the vessel.

7. The method of forming a wrought metal sphere comprising the steps of impact extruding a metal blank to form a cylindrical shell having an integral hemispherical bottom, thereafter progressively and incrementally compressing the cylindrical portion of the shell to complete the forming of the sphere and during said extruding and compressing of the shell exercising substantially full control over the cold flow of the metal so as to avoid excessive buildup of the metal in given parts of the shell structure and undesirable thinning of the metal in the shell structure and the incremental compressing of the cylindrical shell portion being effected without disturbing the previously shaped hemispherical bottom.

8. The method of claim 5 including the step of solution heat treating the workpiece prior to the last extruding step and subsequently artificially aging the finally finished sphere.

* * * * *